(12) United States Patent
Park (10) Patent No.: US 7,450,918 B2
(45) Date of Patent: Nov. 11, 2008

(54) APPARATUS AND METHOD FOR CONTROLLING GAIN OF A TRANSCEIVING DEVICE IN A WIRELESS TERMINAL FOR A COMMUNICATION SYSTEM

(75) Inventor: Hung-Su Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 437 days.

(21) Appl. No.: 11/246,240

(22) Filed: Oct. 11, 2005

(65) Prior Publication Data

US 2006/0079186 A1    Apr. 13, 2006

(30) Foreign Application Priority Data

Oct. 11, 2004    (KR) ...................... 10-2004-0080911

(51) Int. Cl.
*H04B 7/00* (2006.01)
*H04B 1/06* (2006.01)

(52) U.S. Cl. ................. 455/130; 455/232.1; 455/234.2; 455/246.1; 375/345

(58) Field of Classification Search ..... 455/67.11–67.7, 455/226.1–226.4, 127.2, 232.1–253.2; 375/345
See application file for complete search history.

(56) References Cited

U.S. PATENT DOCUMENTS 6,081,564 A * 6/2000 Han ............................ 375/345
6,122,331 A * 9/2000 Dumas ........................ 375/345
6,298,241 B1* 10/2001 Hong ........................... 455/522
6,847,261 B2* 1/2005 Iwata et al. .................. 330/279
7,072,632 B2* 7/2006 Astrachan et al. ......... 455/226.2
7,076,225 B2* 7/2006 Li et al. ..................... 455/245.1
7,103,336 B1* 9/2006 Miyajima et al. ......... 455/250.1
7,127,222 B2* 10/2006 Kim et al. ................. 455/232.1
7,127,223 B2* 10/2006 Jin et al. ................... 455/232.1
7,171,185 B2* 1/2007 Matsumoto et al. ......... 455/324
7,174,190 B2* 2/2007 Walker et al. ............... 455/557
7,212,798 B1* 5/2007 Adams et al. ............. 455/251.1
7,227,916 B2* 6/2007 Ruelke et al. ............... 375/345
2004/0190653 A1* 9/2004 Yasui et al. ................. 375/345
2004/0202133 A1* 10/2004 Filipovic .................... 370/332
2005/0159118 A1* 7/2005 Jin et al. ................... 455/127.2
2005/0276359 A1* 12/2005 Xiong ........................ 375/345

* cited by examiner

*Primary Examiner*—Simon D Nguyen
(74) *Attorney, Agent, or Firm*—Roylance, Abrams, Berdo & Goodman, LLP (57) ABSTRACT

An apparatus for controlling a gain of a transceiving device in a terminal for a communication system is disclosed. A memory stores predetermined thresholds for level-by-level gain controlling. A signal intensity detector detects an intensity value of a received signal. Comparators compare the received signal intensity value with thresholds predetermined according to the current state. A state detector detects a gain level for the current state according to the comparison results provided from the comparators. A controller updates the current state according to the detected gain level, controls a gain of the transceiving device according to the updated current state, and sets thresholds corresponding to the updated current state in the comparators.

8 Claims, 9 Drawing Sheets

APPARATUS AND METHOD FOR CONTROLLING GAIN OF A TRANSCEIVING DEVICE IN A WIRELESS TERMINAL FOR A COMMUNICATION SYSTEM

PRIORITY

This application claims the benefit under 35 U.S.C. § 119 (a) of a Korean Patent Application entitled "Apparatus and Method for Controlling Gain of a Transceiving Device in a Wireless Terminal for a Communication System" filed in the Korean Intellectual Property Office on Oct. 11, 2004 and assigned Serial No. 2004-80911, the entire contents of which are hereby incorporated by reference.

BACKGROUND OF THE INVENTION

1. Field of the Invention

The present invention relates generally to an apparatus and method for controlling a transceiving device in a wireless terminal for a communication system. In particular, the present invention relates to an apparatus and method for controlling a transceiving gain level of a transceiving device in a wireless terminal for a communication system.

2. Description of the Related Art

Generally, a wireless terminal for use in wireless communication systems based on, for example, Code Division Multiple Access (CDMA) or Personal Communication Service (PCS) and various communication systems such as a Digital Multimedia Broadcasting (DMB) system, transmits and receives radio frequency (RF) signals to/from a base station via an antenna. For the signal transmission/reception, the wireless terminal comprises a transceiving device.

The transceiving device for the wireless terminal transmits and receives, for example, RF, Amplitude Modulation (AM), Frequency Modulation (FM), or Phase Modulation (PM) signals via an antenna. In most cases, the transceiving device comprises a transceiving matching block for adjusting intensity of transmission/reception signals.

Figure 1:
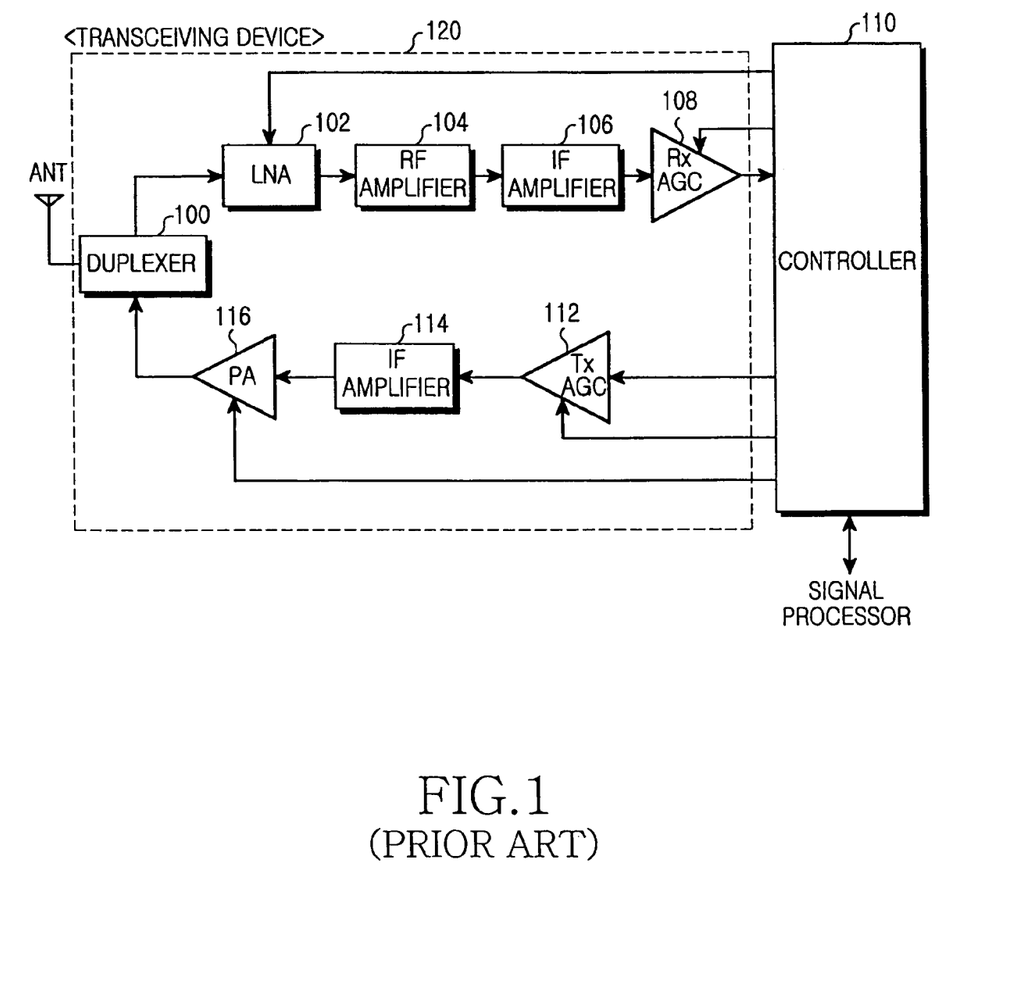
FIG. 1 is a schematic block diagram illustrating a transceiving matching block included in a conventional RF transceiving device.

FIG. 1 is a schematic block diagram illustrating a transceiving matching block included in a RF transceiving device. Referring to FIG. 1, an input signal received via an antenna ANT is applied to a controller 110 through a duplexer 110, a low-nose amplifier (LNA) 102, an RF amplifier 104, an intermediate frequency (IF) amplifier 106 and a receiver automatic gain controller (Rx AGC) 108. A transmission signal is transmitted through a transmitter automatic gain controller (Tx AGC) 112, an IF amplifier 114, a power amplifier (PA) 116, the duplexer 100 and the antenna ANT. The wireless terminal comprises the controller 110 for controlling gains of the LNA 102, the Rx AGC 108, the Tx AGC 112 and the PA 116 such that intensity of the received signal and intensity of the transmission signal can satisfy a predetermined level.

With the tendency toward diversity, complexity and multiplexing of the communication systems, there are various possible methods for controlling a transceiving device 120. For example, the transceiving device 120 is controlled by using a control signal. Alternatively, the transceiving device 120 is controlled by a separate serial interface included therein. In some cases, there is a need to control various gain levels in order to control the transceiving device 120.

In this manner, the transceiving device 120 has a structure for controlling a gain of the LNA 102 in an initial stage of a receiver and a gain of the PA 116 in a final stage of a transmitter by using several kinds of gain levels according to corresponding gain levels, and then controlling a fine gain level at an AGC amplifier. Conventionally, this structure has two kinds of gain levels of N and N+1.

Figure 2A:
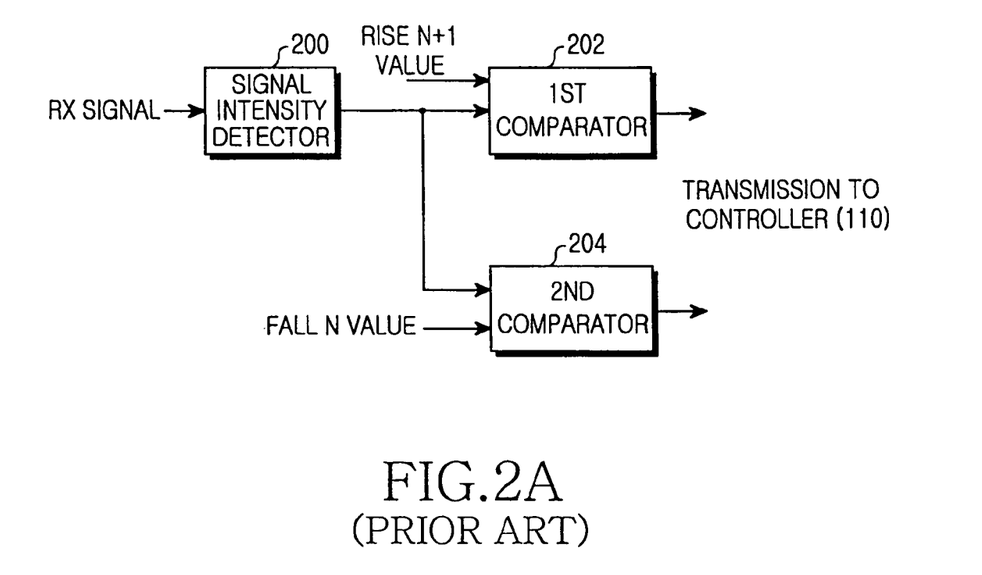
FIG. 2A is a block diagram illustrating a conventional gain level detection device for controlling a transceiving device using two kinds of gain levels.

With reference to FIG. 2A, a description will now be made of a method of controlling a gain of a transceiving device according to two kinds of gain levels. FIG. 2A is a block diagram illustrating a conventional gain level detection device for controlling a transceiving device 120 using two kinds of gain levels.

A signal intensity detector 200 detects a signal intensity value for an input signal received via an antenna. The signal intensity detector 200 outputs the detected signal intensity value to first and second comparators 202 and 204. The comparators 202 and 204 compare the received signal intensity value with a RISE N+1 value, which is a rising threshold, and a FALL N value, which is a falling threshold, respectively. The comparators 202 and 204 each output the results compared with the rising threshold and the falling threshold to a controller 110. Then the controller 110 detects a level state according to the comparison results, and generates a control signal for driving an amplifier of the transceiving device 120 within an appropriate operation range.

Although not illustrated in FIG. 2A, the gain level detection device comprises two timers for the two kinds of gain levels in order to provide timing hysteresis during level state transition. By providing the timers and setting timer values, it is possible to prevent a control circuit from unstably operating when the received signal intensity value rises and falls around the threshold. Of course, when there is no need for the timers, it is possible to operate the control circuit without timer setting.

Figure 2B:
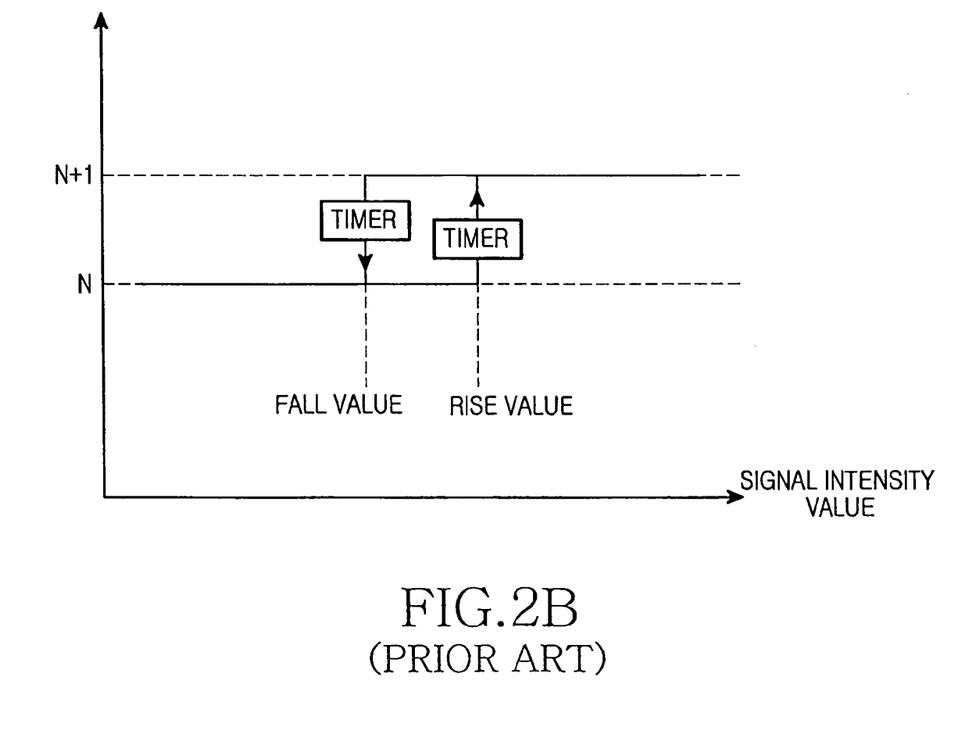
FIG. 2B is an operation waveform diagram illustrating the gain level detection device shown in FIG. 2A.

FIG. 2B is an operation waveform diagram illustrating the gain level detection device of FIG. 2A.

For a gain level N, if a received signal intensity value is greater than or equal to a RISE value, the gain level detection device drives a timer by a timer setting value, in other words, drives a timer for the time indicated by a timer setting value. Thereafter, if the received signal intensity value is greater than or equal to the RISE value when the timer expires, the gain level changes to N+1. Thereafter, for a gain level N+1, if a received signal intensity value is smaller than or equal to a FALL value, the gain level detection device drives a timer by a timer setting value. Thereafter, if the received signal intensity value is smaller than or equal to the FALL value when the timer expires, the gain level changes to N.

Figure 2C:
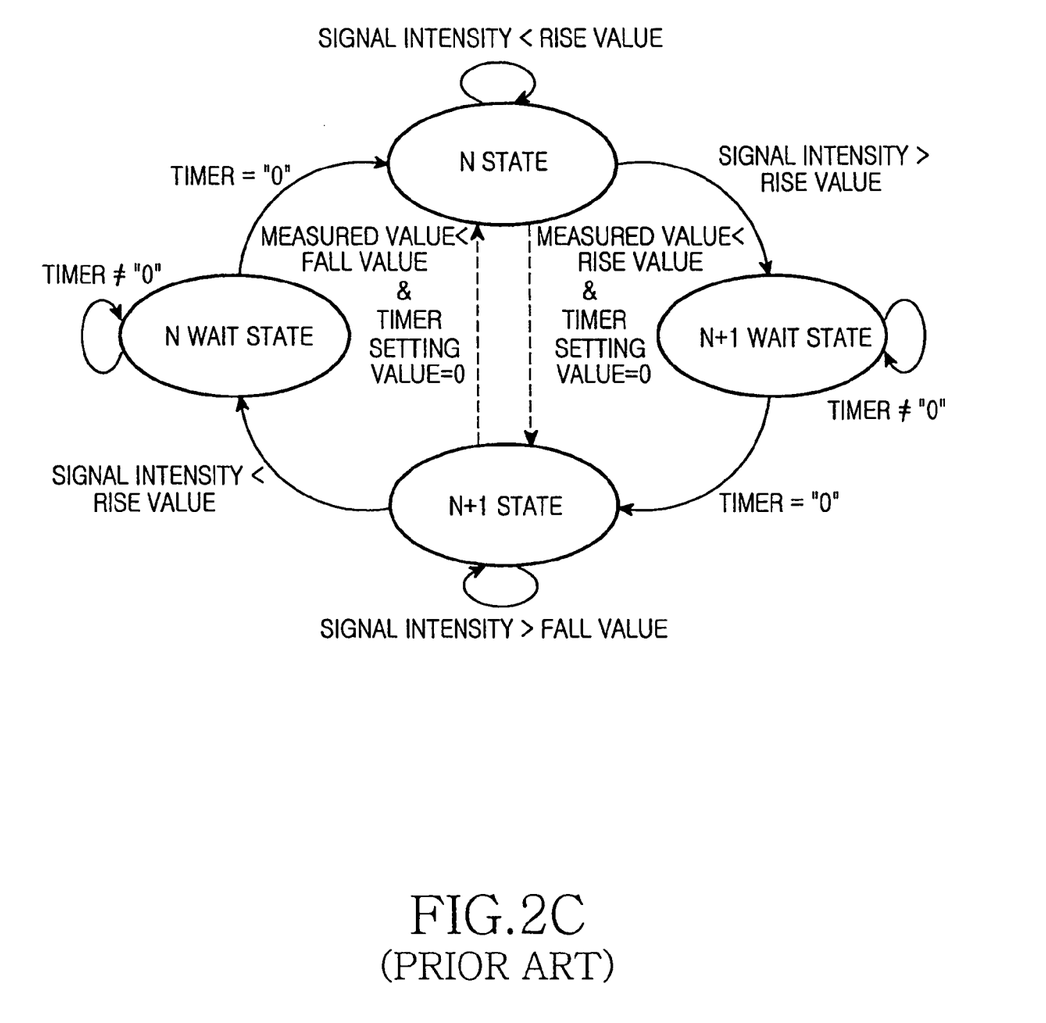
FIG. 2C is a state transition diagram illustrating the gain level detection device illustrated in FIG. 2A.

FIG. 2C is a state transition diagram illustrating the gain level detection device illustrated in FIG. 2A.

If a received signal intensity value is smaller than or equal to a RISE value, the gain level detection device stays in an N state. If the received signal intensity value becomes greater than the RISE value and the received signal intensity value is greater than the RISE value until a timer expires in an N+1 wait state, the gain level detection device transitions to an N+1 state. If the received signal intensity is greater than or equal to a FALL value, the gain level detection device holds the N+1 state. In the meantime, if the received signal intensity value becomes smaller than the FALL value, the gain level detection device goes to the N state. Thereafter, if the received signal intensity value is smaller than the FALL value until a timer expires, the gain level detection device transitions to the N state. In the case where no timer is used, if the received signal intensity value is greater than or equal to the RISE value in the N state, the gain level detection device immediately transitions to the N+1 state, and if the received signal intensity value is smaller than or equal to the FALL value in the N+1 state, the gain level detection device immediately transitions to the N state.

Figure 3A:
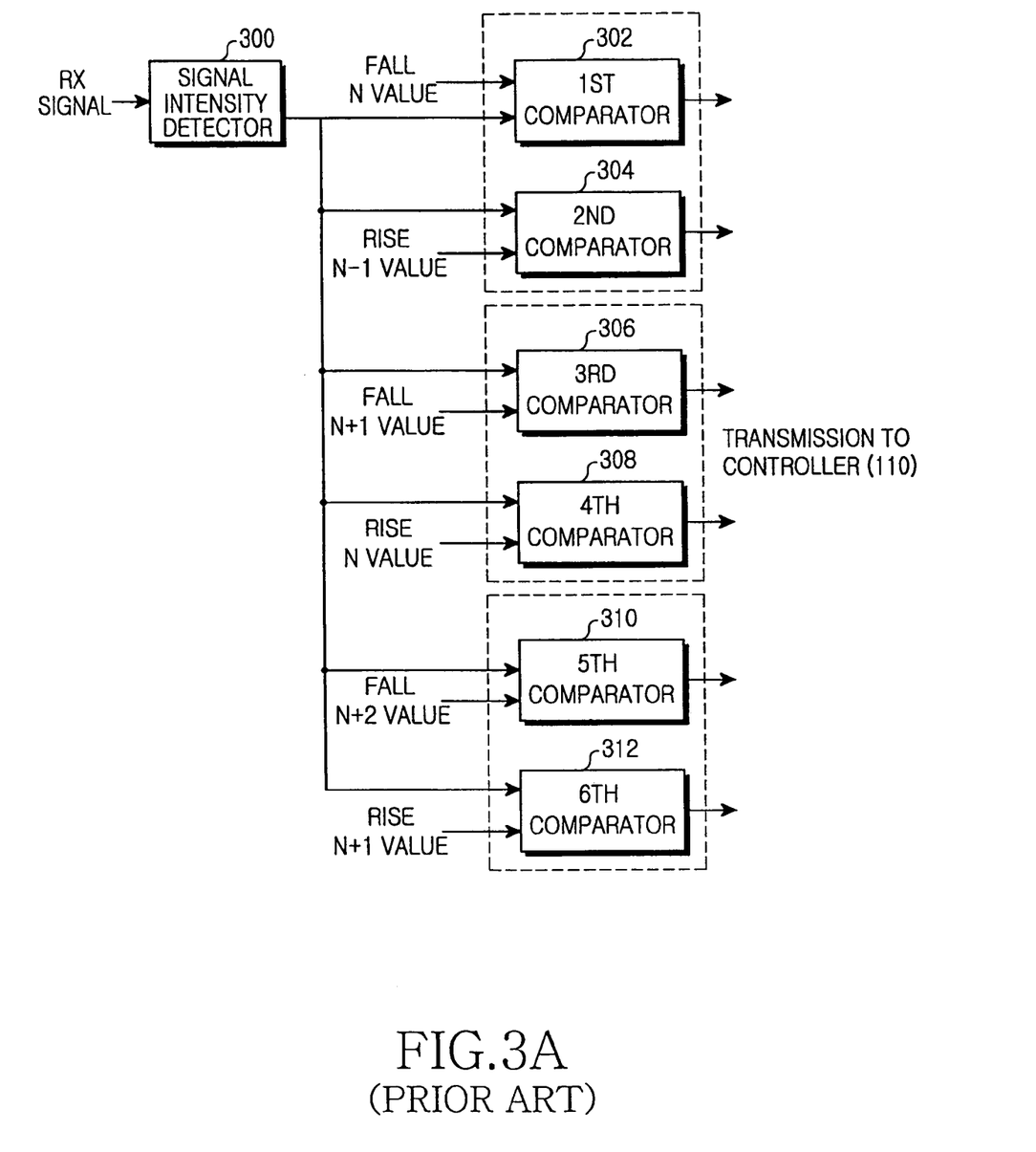
FIG. 3A is a block diagram illustrating a gain level detection device for controlling a transceiving device with four kinds of gain levels.

FIG. 3A is a block diagram illustrating a gain level detection device for controlling a transceiving device with four kinds of gain levels to control the transceiving device having a plurality of gain levels by extending the 2-level state-based gain control of FIG. 2A.

Figure 3B:
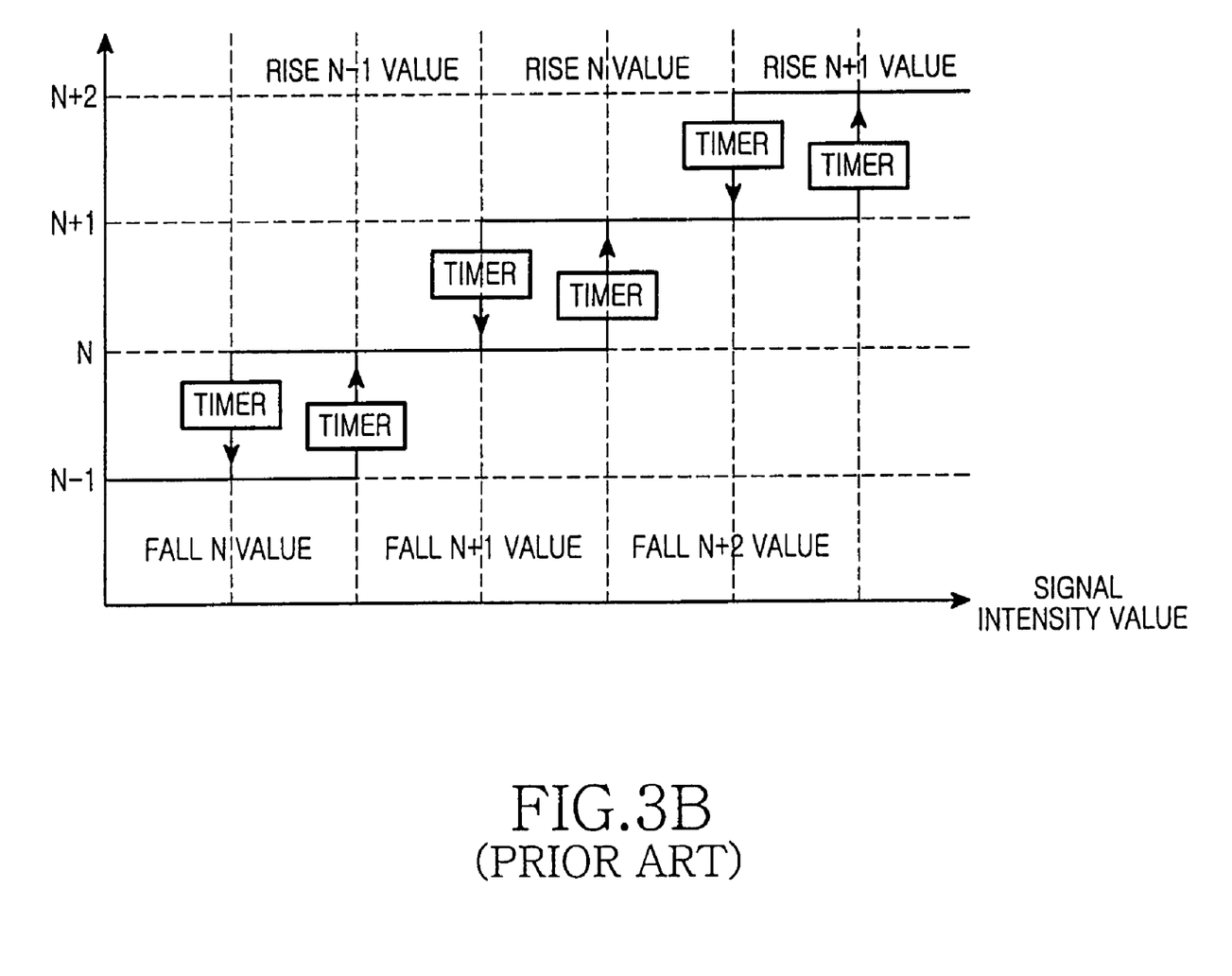
FIG. 3B is an operation waveform diagram illustrating the gain level detection device shown in FIG. 3A.

To control four kinds of gain levels, the gain level detection device requires six comparators 302, 304, 306, 308, 310 and 312, and six timers when timers are used. That is, referring to FIG. 3B, because there are six thresholds of a FALL N value, a RISE N−1 value, a FALL N+1 value, a RISE N value, a FALL N+2 value and a RISE N+1 value for transition to gain levels of N−1, N, N+1 and N+2, to be compared with a received signal intensity value, the gain level detection device requires six comparators.

As a result, the number of comparators and timers increases with the number of gain levels for controlling a gain of the transceiving device. That is, in the structure for controlling a gain of the transceiving device according to a plurality of gain level states, the number of required comparators and timers depends on the number of gain level states for gain control.

Therefore, an increase in number of the gain level states increases the required number of comparators and timers included in a wireless terminal, causing an increase in complexity or size of the wireless terminal. In some cases, the number of logics can be reduced to some extent through timing sharing or structure sharing design, but the increase in the overall hardware complexity due to the additional logics is considerable.

In addition, in the case of designing the hardware with a fixed gain level, its flexibility decreases due to the fixing of the supported gain level during a compatibility test actually applied to the transceiving device or when the transceiving device is replaced with a new one.

SUMMARY OF THE INVENTION

Therefore, an object of the present invention is to provide an apparatus and method for controlling a gain level of a transceiving device in a wireless terminal for a communication system.

Another object of the present invention is also to provide an apparatus and method for reducing a size of a transceiving device in a wireless terminal for a communication system.

Further another object of the present invention is to provide an apparatus and method for efficiently controlling a gain by designing a transceiving device such that its flexibility increases during a compatibility test applied to the transceiving device or when the transceiving device is replaced with a new one, in a wireless terminal for a communication system.

To achieve the above and other objects, an apparatus for controlling a gain of a transceiving device in a terminal for a communication system is provided. The apparatus comprises a memory for storing predetermined thresholds for level-by-level gain controlling, a signal intensity detector for detecting an intensity value of a received signal, comparators for comparing the received signal intensity value with thresholds predetermined according to the current state, a state detector for detecting a gain level for the current state according to the comparison results provided from the comparators, and a controller for updating the current state according to the detected gain level, controlling a gain of the transceiving device according to the updated current state, and setting thresholds corresponding to the updated current state in the comparators.

Preferably, the thresholds comprise a rising threshold and a falling threshold according to the current state.

Preferably, the comparators comprises a first comparator for comparing the received signal intensity value with the rising threshold for the current state, and a second comparator for comparing the received signal intensity value with the falling threshold for the current state.

Preferably, the state detector generates an interrupt signal to set a wait state when the current state is about to be updated.

Preferably, the gain control apparatus further comprises a timer which is driven for a predetermined time in a wait state.

To achieve the above and other objects, a method for controlling a gain of a transceiving device in a terminal for a communication system is provided. The method comprises the steps of (a) storing predetermined thresholds for level-by-level gain controlling in a memory, (b) detecting an intensity value of a received signal, (c) comparing the received signal intensity value with thresholds predetermined according to the current state, (d) detecting a gain level for the current state according to the comparison results, and updating the current state according to the detected gain level, and (e) controlling a gain of the transceiving device according to the updated current state, and setting thresholds corresponding to the updated current state in corresponding comparators.

Preferably, the thresholds comprise a rising threshold and a falling threshold according to the current state.

Preferably, the step (c) comprises the steps of comparing the received signal intensity value with the rising threshold for a gain level for controlling a current gain, and comparing the received signal intensity value with the falling threshold for a gain level for controlling the current gain.

Preferably, the step (d) comprises the step of generating an interrupt signal to update the gain level and providing thresholds for the updated gain level to the comparators when the current state is about to be updated.

Preferably, the step (d) comprises the step- of holding a wait state for a predetermined time if the current state satisfies an update condition, and updating the current state if the current state satisfies the update condition even after a lapse of the predetermined time.

BRIEF DESCRIPTION OF THE DRAWINGS

The above and other objects, features and advantages of the present invention will become more apparent from the following detailed description when taken in conjunction with the accompanying drawings in which.

Throughout the drawings, like reference numerals will be understood to refer to like parts, components and structures.

DETAILED DESCRIPTION OF EXEMPLARY EMBODIMENTS

Several exemplary embodiments of the present invention will now be described in detail with reference to the accompanying drawings. In the following description, a detailed description of known functions and configurations incorporated herein has been omitted for clarity and conciseness.

Figure 4:
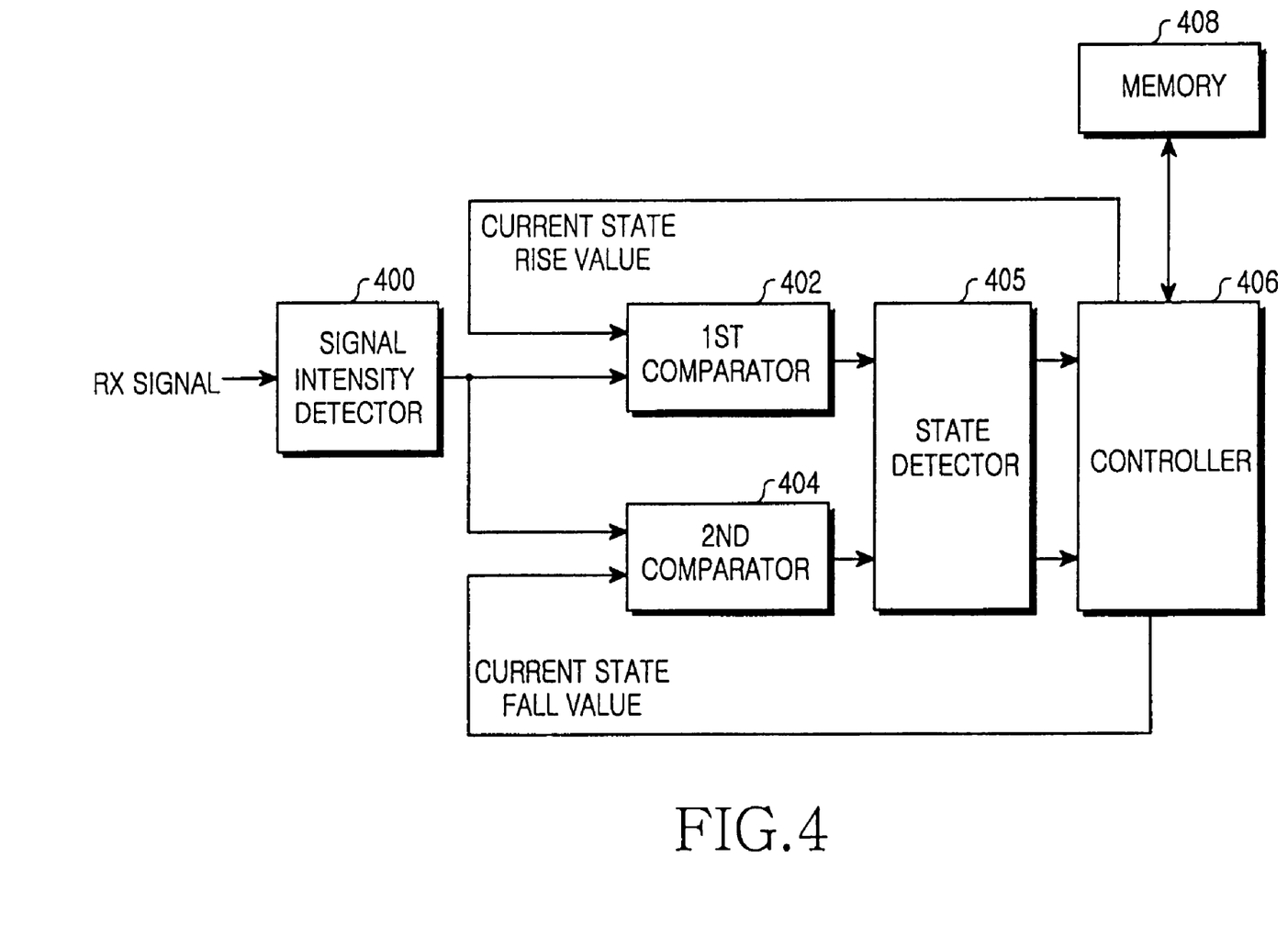
FIG. 4 is a block diagram illustrating an apparatus for controlling a gain of a transceiving device according to an exemplary embodiment of the present invention.

FIG. 4 is a block diagram illustrating an apparatus for detecting a gain level and controlling a gain of a transceiving device depending on the detected gain level according to an exemplary embodiment of the present invention. A description will now be made as to how the gain control apparatus shown in FIG. 4 controls a gain of the transceiving device shown in FIG. 1.

The gain control apparatus stores RISE values and their associated FALL values for individual gain levels in a memory 408. A controller 406 reads a RISE value and a FALL value corresponding to a current gain level used for controlling the transceiving device from the memory 408, and outputs the read RISE value and FALL value to a first comparator 402 and a second comparator 404, respectively.

A detailed description will now be made of an operation of controlling a gain of the transceiving device according to a received signal intensity value. A gain level used for controlling an initial current state after power-on of the wireless terminal, in other words, a current gain of the transceiver, will be defined herein as N. It will be assumed herein that the "current state" is equivalent to the current gain level used for controlling the transceiving device.

A signal intensity detector 400 detects a signal intensity value for an input signal received via an antenna ANT, and applies the detected signal intensity value to both the first comparator 402 and the second comparator 404. Then the first comparator 402 compares the signal intensity value with the RISE value in the N state, provided from the controller 406, and outputs a logic signal of '0' or '1' to a state detector 405 according to the comparison result. Similarly, the second comparator 404 compares the signal intensity value with the FALL value in the N state, provided from the controller 406, and outputs a logic signal of '0' or '1' to the state detector 405 according to the comparison result.

Upon receipt of the logic signals output from the first comparator 402 and the second comparator 404, the state detector 405 detects a current state according to the output values of the comparators 402 and 404. That is, the state detector 405 determines whether to hold the current state at the N state, whether to transition to an N+1 wait state, whether to transition to an N+1 state, whether to transition to an N−1 wait state, or whether to transition to an N−1 state according to the output values of the comparators 402 and 404.

The state detector 405 outputs an interrupt signal used for holding the current state N or transitioning to another state, to the controller 406. The controller 406 changes a gain level for controlling a gain of the transceiving device according to the interrupt signal, and controls a gain of the transceiving device using the changed gain level. Further, the controller 406 sets a FALL value and a RISE value stored in the memory 408 according to the changed gain level.

Figure 5:
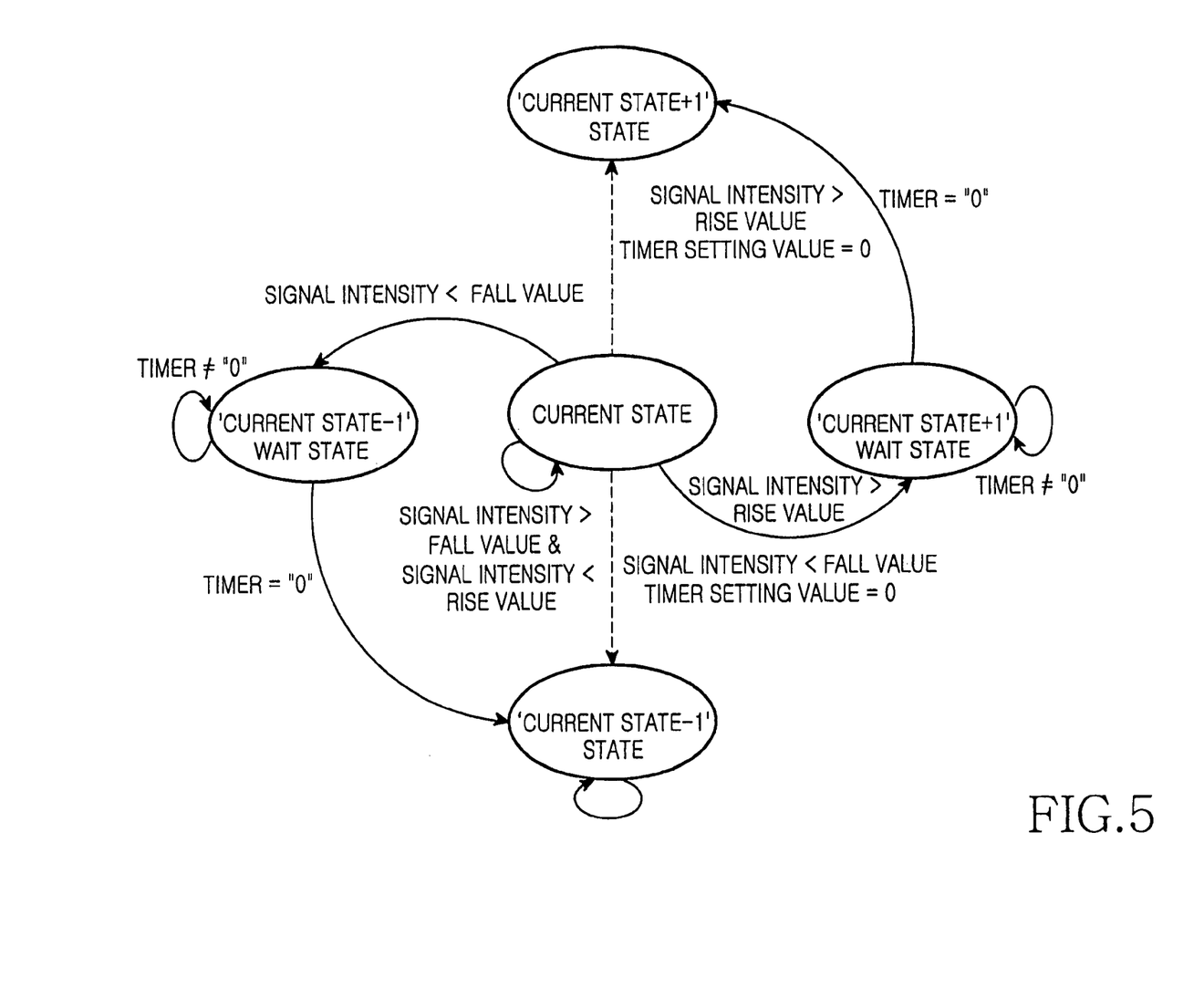
FIG. 5 is a state transition diagram illustrating a gain control apparatus according to an exemplary embodiment of the present invention.

The state transition will now be described in more detail with reference to FIG. 5. FIG. 5 is a state transition diagram illustrating the gain control apparatus shown in FIG. 4. An initial current state will be assumed herein as an N state.

As a result of comparison between the signal intensity value detected by the signal intensity detector 400 and the RISE value and the FALL value in the current state by the first comparator 402 and the second comparator 404, if the signal intensity value is greater than the FALL value or smaller than the RISE value, the state detector 405 recognizes a state for holding a gain level N used for controlling the current gain of the transceiving device.

If the detected signal intensity value is greater than or equal to the RISE value, the gain control apparatus transitions to a 'current state+1' wait state. Upon entry into the 'current state+1' wait state, the gain control apparatus drives a timer by a predetermined timer setting value, in other words, drives a timer for the time indicated by a predetermined timer setting value. If the detected signal intensity value is greater than or equal to the RISE value even when the timer expires in the 'current state+1' wait state, the gain control apparatus transitions to a 'current state+1' state. After the transition from the current state to the 'current state+1' state, the 'current state+1' state becomes a new current state.

If the signal intensity value detected in the current state is smaller than or equal to the FALL value, the gain control apparatus transitions to a 'current state−1' wait state. Upon entry into the 'current state−1' wait state, the gain control apparatus drives a timer by a predetermined timer setting value. If the detected signal intensity value is smaller than or equal to the FALL value even when the timer expires in the 'current state−1' wait state, the gain control apparatus transitions to a 'current state−1' state. After the transition from the current state to the 'current state−1' state, the 'current state−1' state becomes a new current state.

When the gain control apparatus sets a timer setting value to '0' after the transition from the current state to the 'current state+1' state or the 'current state−1' state, or when the gain control apparatus uses no timer, it transitions to the 'current state+1' state if the signal intensity value is greater than or equal to the RISE value, and transitions to the 'current state−1' state if the signal intensity value is smaller than or equal to the FALL value.

Assuming that a gain level used for controlling a gain of the transceiver in the current state is defined as N, if the signal intensity value is greater than or equal to the RISE value corresponding to the gain level N, the gain control apparatus transitions to the 'current state+1' wait state. If the signal intensity value is greater than or equal to the RISE value even when a timer expires after driving the timer according to a timer setting value in the 'current state+1' wait state, the gain control apparatus transitions to an N+1 gain level representative of the 'current state+1' state. When the gain level transitions from N to N+1, the 'current state+1' state becomes a new current state. As a result, the controller 406 outputs a gain control signal for the transceiver according to the N+1 gain level. After updating the current state, the gain control apparatus sets a RISE value and a FALL value corresponding to the updated new current state.

Figure 6A:
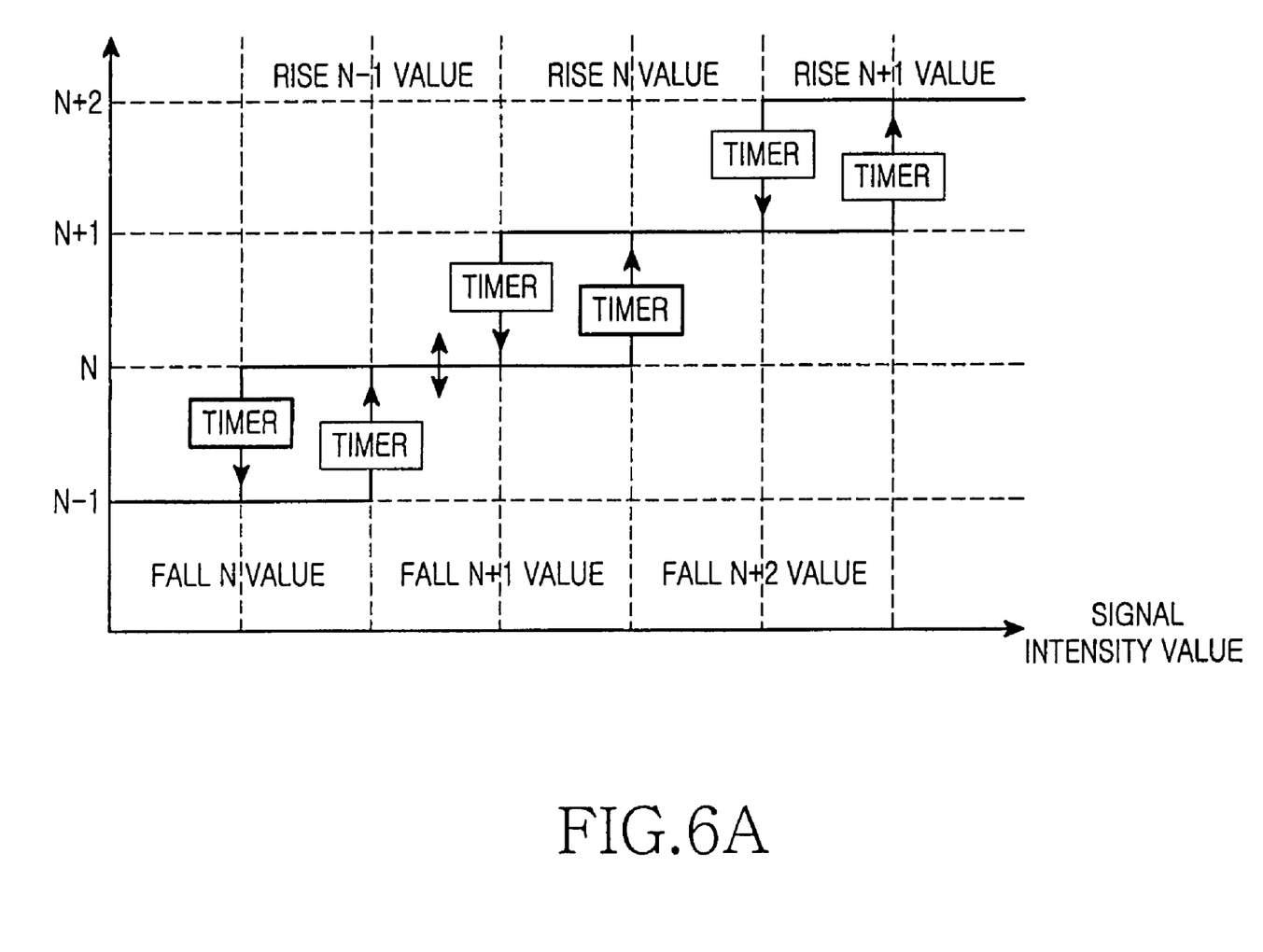
FIGS. 6A and 6B are operation waveform diagrams illustrating a gain control apparatus for the transceiving device according to an exemplary embodiment of the present invention.
Figure 6B:
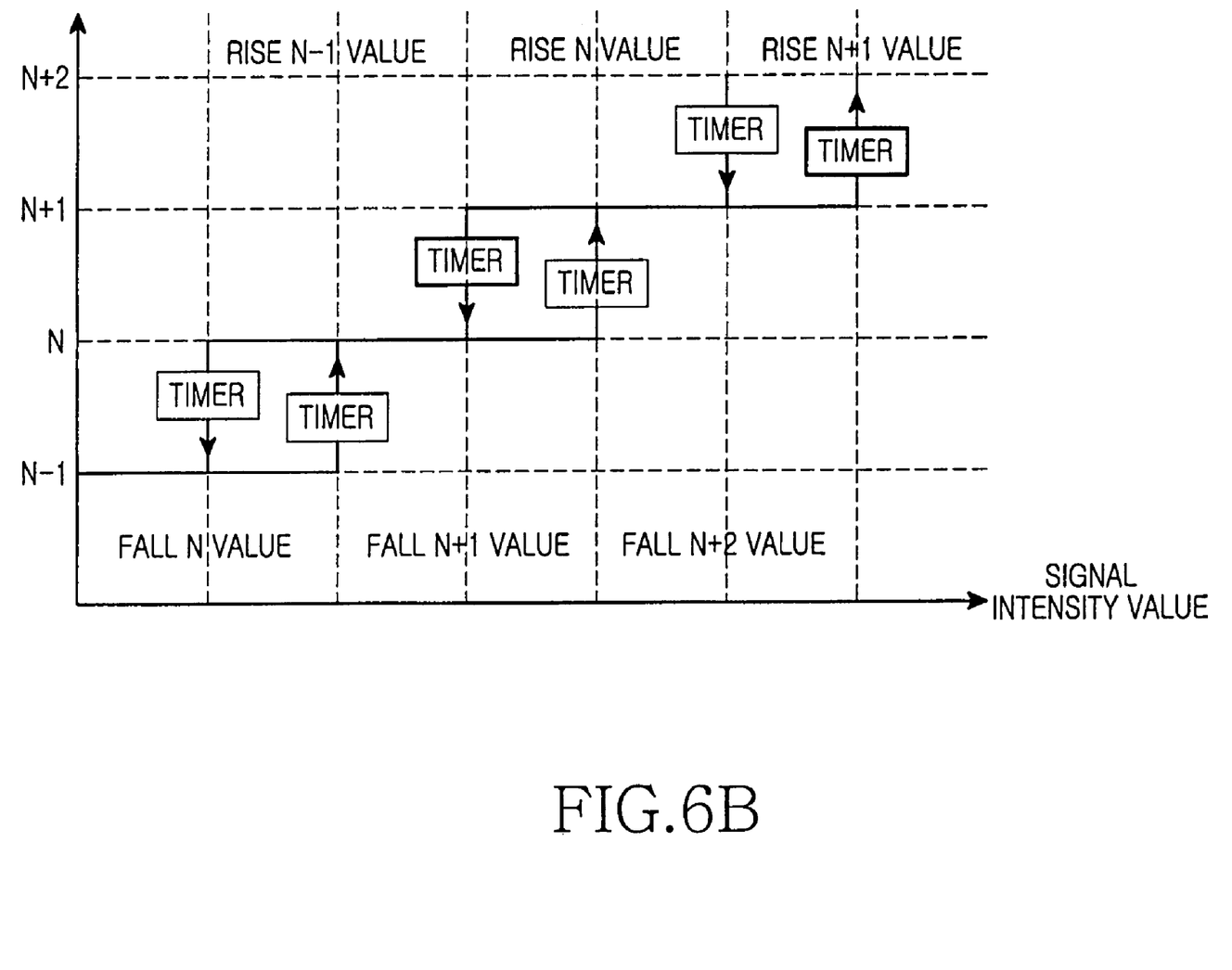

FIGS. 6A and 6B are operation waveform diagrams illustrating the gain control apparatus for the transceiving device, shown in FIG. 4. It is assumed in FIGS. 6A and 6B that the gain control apparatus comprises four kinds of gain levels. In addition, the current state is denoted by N in FIG. 6A and by N+1 in FIG. 6B, by way of example.

Referring to FIG. 6A, the bold line represents the current state. A gain level in the current state is denoted by N, and the gain control apparatus controls a gain of the transceiving device according to the gain level N. In addition, the RISE value input to the first comparator 402 of FIG. 4 is set to a RISE N value and the FALL value input to the second comparator 404 is set to a FALL N value.

Thereafter, if a signal intensity value for a received signal is smaller than equal to the FALL N value, the gain control apparatus drives a timer by a timer setting value. If the received signal intensity value is smaller than equal to the FALL N value even after the timer expires, the gain control apparatus transitions from the gain level N to a gain level N−1 in terms of the current state.

However, if the signal intensity value for the received signal is greater than or equal to the RISE N value, the gain control apparatus drives a timer by a timer setting value. If the received signal intensity value is greater than equal to the RISE N value even after the timer expires, the gain control apparatus transitions from the gain level N to a gain level N+1 in terms of the current state. An operation in the current state denoted by N+1 will be described with reference to FIG. 6B.

That is, if it is determined by the first comparator 402 and the second comparator 404 that a signal intensity value detected for the received signal by the signal intensity detector 400 is greater than or equal to the RISE N value and a smaller than or equal to the FALL N value, the state detector 405 provides the controller 406 with an interrupt signal to inform that it is in a wait state to transition to the corresponding state. Upon entry into the wait state, the state detector 405 drives a timer by a timer setting value. Thereafter, if the timer expires, the state detector 405 outputs an interrupt signal to the controller 406 to inform transition in the current state. Then the controller 406, recognizing the transmission in the current state, controls a gain of the transceiving device with a gain level for the new current state. Generally, in this case, the controller 406 can control the gain of the transceiving device using either a control signal used for controlling a gain of the transceiving device, or a structure for setting a separate serial interface included therein. While controlling the gain of the transceiving device, the controller 406 sets a RISE N+1 and a FALL N+1 value, or a RISE N−1 and a FALL N−1 value, as new RISE value and FALL value, upon recognizing the transition to the new current state of N+1 or N−1. The controller 406 can support not only the single level-based state transition, but also multilevel-based state transition.

In FIG. 6A, if the received signal intensity value is greater than or equal to the RISE N value in the current state with a gain level N and a timer has expired after the state detector 405 set the timer by a timer setting value, the state detector 405 outputs an interrupt signal to the controller 406 to inform transition in gain level to N+1.

Then the controller 406 changes the gain level from N to N+1 according to the received interrupt signal, and controls a gain of the transceiving device using the new gain level N+1. Upon changing the current state from N to N+1, the controller 406 outputs a RISE N+1 value, which is a threshold for transition to N+2, and a FALL N+1 value, which is a threshold for transition to N, to the first comparator 402 and the second comparator 404, respectively.

An operation waveform diagram of the gain control apparatus for the transceiving device after a gain level of the current state changes to N+1 is shown in FIG. 6B.

Referring to FIG. 6B, the bold line represents the current state in which a gain of the transceiving device is controlled with a gain level N+1. At this time, the RISE value input to the first comparator 402 of FIG. 4 is set to a RISE N+1 value and the FALL value input to the second comparator 404 is set to a FALL N+1 value.

Thereafter, if a signal intensity value for a received signal is smaller than equal to the FALL N+1 value, the gain control apparatus drives a timer by a timer setting value. If the received signal intensity value is smaller than equal to the FALL N+1 value even after the timer expires, the gain control apparatus transitions from the gain level N+1 to a gain level N in terms of the current state.

However, if the signal intensity value for the received signal is greater than or equal to the RISE N+1 value, the gain control apparatus drives a timer by a timer setting value. If the received signal intensity value is greater than equal to the RISE N+1 value even after the timer expires, the gain control apparatus transitions from the gain level N+1 to a gain level N+2 in terms of the current state.

As can be understood from the foregoing description, the present invention can prevent an increase in hardware size caused by an increase in number of gain levels used for controlling a gain of a transceiving device for signal transmission/reception in a communication system. In addition, the present invention can provide extensionability and flexibility of the transceiving device.

While the invention has been shown and described with reference to a certain exemplary embodiment thereof, it will be understood by those skilled in the art that various changes in form and details may be made therein without departing from the spirit and scope of the invention as defined by the appended claims.

What is claimed is:

1. An apparatus for controlling a gain of a transceiving device in a terminal for a communication system, the apparatus comprising:
   a memory for storing predetermined thresholds for level-by-level gain controlling;
   a signal intensity detector for detecting an intensity value of a received signal;
   comparators for comparing the received signal intensity value with at least one of a predetermined rising threshold and a predetermined falling threshold according to the current state;
   a state detector for detecting a gain level for the current state according to the comparison results provided from the comparators; and
   a controller for updating the current state according to the detected gain level, controlling a gain of the transceiving device according to the updated current state, and setting thresholds corresponding to the updated current state in the comparator.

2. The apparatus of claim 1, wherein the comparators comprises:
   a first comparator for comparing the received signal intensity value with the rising threshold for the current state; and
   a second comparator for comparing the received signal intensity value with the falling threshold for the current state.

3. The apparatus of claim 1, wherein the state detector generates an interrupt signal to set a wait state when the current state is about to be updated.

4. The apparatus of claim 1, further comprising a timer which is driven for a predetermined time in the wait state.

5. A method for controlling a gain of a transceiving device in a terminal for a communication system, the method comprising the steps of:
   (a) storing predetermined thresholds for level-by-level gain controlling in a memory;
   (b) detecting an intensity value of a received signal;

(c) comparing the received signal intensity value with at least one of a predetermined rising threshold and a predetermined falling threshold according to the current state;

(d) detecting a gain level for the current state according to the comparison results, and updating the current state according to the detected gain level; and (e) controlling a gain of the transceiving device according to the updated current state, and setting thresholds corresponding to the updated current state in corresponding comparators.

6. The method of claim 5, wherein the step (c) comprises the steps of:

comparing the received signal intensity value with the rising threshold for a gain level for controlling a current gain; and comparing the received signal intensity value with the falling threshold for a gain level for controlling the current gain.

7. The method of claim 5, wherein the step (d) comprises the step of generating an interrupt signal to update the gain level and providing thresholds for the updated gain level to the comparators when the current state is about to be updated.

8. The method of claim 5, wherein the step (d) comprises the step of holding a wait state for a predetermined time if the current state satisfies an update condition, and updating the current state if the current state satisfies the update condition even after a lapse of the predetermined time.

* * * * *